United States Patent
Nozoe et al.

(10) Patent No.: US 6,359,806 B1
(45) Date of Patent: *Mar. 19, 2002

(54) MEMORY DEVICE

(75) Inventors: Atsushi Nozoe, Hino; Kazuo Nakamura, Fussa; Kunihiro Katayama, Chigasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,036

(22) Filed: Apr. 26, 2000

(30) Foreign Application Priority Data

Apr. 26, 1999 (JP) .......................................... 11-118567

(51) Int. Cl.⁷ ............................................. G11C 16/06
(52) U.S. Cl. ............................. 365/185.09; 365/185.11; 365/185.33
(58) Field of Search .................. 365/185.09, 185.11, 365/185.33, 233, 233.5, 238.5, 229

(56) References Cited

U.S. PATENT DOCUMENTS 5,359,569 A  * 10/1994  Fujita et al. ................. 365/229
6,034,891 A  *  3/2000  Norman .................. 365/185.09

FOREIGN PATENT DOCUMENTS

| JP | 3181197 | 7/1988 |
| JP | 1133299 | 5/1989 |
| JP | 1235100 | 9/1989 |
| JP | 4206100 | 7/1992 |
| JP | 4289599 | 10/1992 |
| JP | 4335300 | 11/1992 |
| JP | 5128895 | 5/1993 |

OTHER PUBLICATIONS

Tanzawa. T. et al; A Compact On–Chip ECC for Low Cost Flash Memories, (IEEE Journal of Solid–State Circuits, vol. 32, No. 5, May, 1997) pp. 662–669.

* cited by examiner

Primary Examiner—David Nelms
Assistant Examiner—David Lam
(74) Attorney, Agent, or Firm—Antonelli, Terry, Stout & Kraus, LLP

(57) ABSTRACT

A nonvolatile memory device having an error correcting function, capable of outputting read-out data (uncorrected) while simultaneously generating syndromes. After the syndrome formation, the memory device outputs an error status signal (ERR) and, depending on the presence or absence of an externally supplied request (SC), again outputs read-out data (this time corrected).

14 Claims, 5 Drawing Sheets

MEMORY DEVICE

BACKGROUND OF THE INVENTION

The present invention relates to techniques adapted advantageously to a memory device in which data is to be stored along with error correcting codes. More particularly, the invention relates to techniques utilized effectively in a nonvolatile semiconductor memory such as a flash memory and to an IC card incorporating that memory.

There exists a nonvolatile semiconductor memory called a flash memory capable of having its stored data erased electrically in units of predetermined blocks. In the form of memory cells, the flash memory employs nonvolatile storage elements each made of a MOSFET of a two-layer gate structure having a control gate and a floating gate. One transistor constitutes one memory cell.

In such a flash memory, as shown in FIG. 8A, a threshold voltage of a nonvolatile memory cell is driven High (e.g., to logical "1") by applying a high voltage (e.g., 16V) via a word line to a control gate CG of the cell. by applying ground potential (0V) via a bit line to a drain D of the cell (source S is left open), and by injecting a negative charge to a floating gate FG of the cell. The threshold voltage of the cell is brought Low (e.g., to logical "0"), as shown in FIG. 8B, by applying a negative voltage (−16V) via the word line to the control gate CG, by applying ground potential to the drain D and source S, and by electrically discharging the floating gate FG. In the manner outlined above, one bit of data is stored in one memory cell.

Memory cells having different threshold voltage set therein allow different drain currents to flow therethrough depending on the voltages applied to the control gates. When data are to be read out, the difference between drain currents is taken advantage of. That is, an intermediate voltage between the two threshold voltages is applied to the control gate of a given cell so as to detect its drain current quantity allowing the stored data to be judged as "1" or "0".

In the flash memory, write and read operations are carried out illustratively in units of sectors. That is, a write or a read operation is performed simultaneously on a row of memory cells sharing a word line. An erase operation is executed simultaneously on a block, i.e., on a plurality of sectors sharing a well region. In describing embodiments of this invention below, these specifics are assumed but not specifically referred to.

Generally, the flash memory may submit received data to an error correction coding process based on the Hamming code, Reed-Solomon code or the like so as to store the data together with redundant codes. At the time of data read operations, the flash memory is often arranged to output automatically corrected data using error correcting codes.

SUMMARY OF THE INVENTION

In a conventional flash memory having an error correcting function, as shown in FIG. 7, desired data ate typically read from a memory array into a data register or the like and transferred successively from there to an error correcting circuit whereby syndromes are formed indicating whether any error has occurred. The read-out data in the data register are again transferred successively to the error correcting circuit for error correction before being sent to the outside.

In the above process, it takes a total time period of "tACC+tSYN+tOUT" for an external device such as a microprocessor that accessed the memory to acquire all target data therefrom. In the above expression, "tACC" denotes the period from the time a read request is issued to the memory until the data in the memory cells at the specified address are latched into the data register; "tSYN" represents the time it takes to form syndromes; and "tOUT" stands for the time required to output all data from the data register while the data are being corrected.

In more specific example;, the time "tSYN" is about 102 $\mu$s for a memory whose sectors are constituted by 2 kilobytes each and whose one-byte transfer cycle is 50 ns. Even if no error exists in the read-out data, the time "tSYN" is always included as an overhead. Moreover, the probability of any read-out data actually containing an error is considerably low. As a result, the read time is often prolonged unnecessarily.

It is therefore an object of the present invention to provide techniques allowing a nonvolatile memory device with an error correcting function to shorten the time required to read data therefrom.

It is another object of the present invention to provide a nonvolatile memory device capable of indicating externally the presence or absence of error in the output data as well as the status of data error correction.

Other objects, features and advantages of the invention will become more apparent upon a reading of the following description and appended drawings.

In a broad outline, the present invention envisages providing a nonvolatile memory device (a nonvolatile semiconductor memory or a memory system comprising that memory) for outputting read-out data (uncorrected) while simultaneously generating syndromes. After the syndrome formation, the inventive memory device outputs an error status signal (ERR) indicating whether any error has occurred and may again output read-out data (corrected) depending on the presence or absence of a request (SC) from the outside.

In carrying out the invention more specifically and according to one aspect thereof, there is provided a memory device comprising: a memory array made of a plurality of nonvolatile memory cells arranged in matrix fashion, each of the nonvolatile memory cells being furnished with a control gate and a floating gate and having a threshold voltage corresponding to data held therein; and an error correcting circuit which receives data read from a plurality of memory cells in the memory array and which corrects any error included in the read-out data: wherein the read-out data are sent in a predetermined block from the memory array to the error correcting circuit while being externally output simultaneously; wherein the error correcting circuit externally outputs, either upon completion of the data output or immediately thereafter, an error status signal indicating whether any error is included in the read-out data; and wherein upon detection of any error in the read-out data of the predetermined block from the memory array, the error correcting circuit corrects the error.

With the above structure, the read-out data are output during syndrome formation by the error detection circuit. If the error status signal indicates the absence of any error, the obtained data are thus immediately processed as effective read-out data. This structure drastically reduces the time required to read data from the memory device.

In one preferred structure according to the invention, the memory device may further comprise a data holding element for holding data read in a predetermined block from a plurality of memory cells in the memory array, wherein, if any error is found included in the read-out data, the data holding element causes the read-out data held therein to be corrected by the error correcting circuit before having the corrected data output externally. In case of an error, this preferred structure causes the same data to be fed immediately from data registers to the error correcting circuit for error correction without accessing the memory array anew.

In another preferred structure according to the invention, the memory device may further comprise an element for outputting correction status information if any error in the read-out data has been corrected by the error correcting circuit. The structure allows a user to know that the obtained data are corrected data.

In a further preferred structure according to the invention, the correction status information may include information indicating whether the error in the read-out data has been corrected properly. This feature allows the user to know whether the detected error has been corrected adequately.

In an even further preferred structure according to the invention, the data read uncorrected from the memory array and the corrected data furnished by the error correcting circuit may be output in synchronism with an externally supplied clock signal. This structure terminates output of the read-out data when the clock signal is stopped, and permits immediate output of the corrected data when the supply of the clock signal is continued or resumed. Because the structure adopts a simplified control scheme, loads on a connected external device or on a controller in a chip comprising the memory device are alleviated.

In a still further preferred structure according to the invention, the memory array and the error correcting circuit may be formed on a single semiconductor chip, and the uncorrected and the corrected read-out data may be output from a terminal also acting as a terminal through which to input a signal denoting a data read request from the outside. This structure helps reduce the number of external terminals and thereby contributes to decreasing the overall chip size.

According to another aspect of the invention, there is provided a memory card comprising a memory device including a memory array, a control circuit for issuing read requests to the memory device, and an error correcting circuit. Data read in a predetermined block from the memory array are sent to the error correcting circuit while being output to the outside. At the end of the output, there is externally output an error status signal indicating whether any error is included in the data read out by the error correcting circuit. This structure constitutes a memory card allowing desired data to be read out in a short time.

DESCRIPTION OF THE PREFERRED EMBODIMENTS

Preferred embodiments of this invention will now be described with reference to the accompanying drawings.

Figure 1:
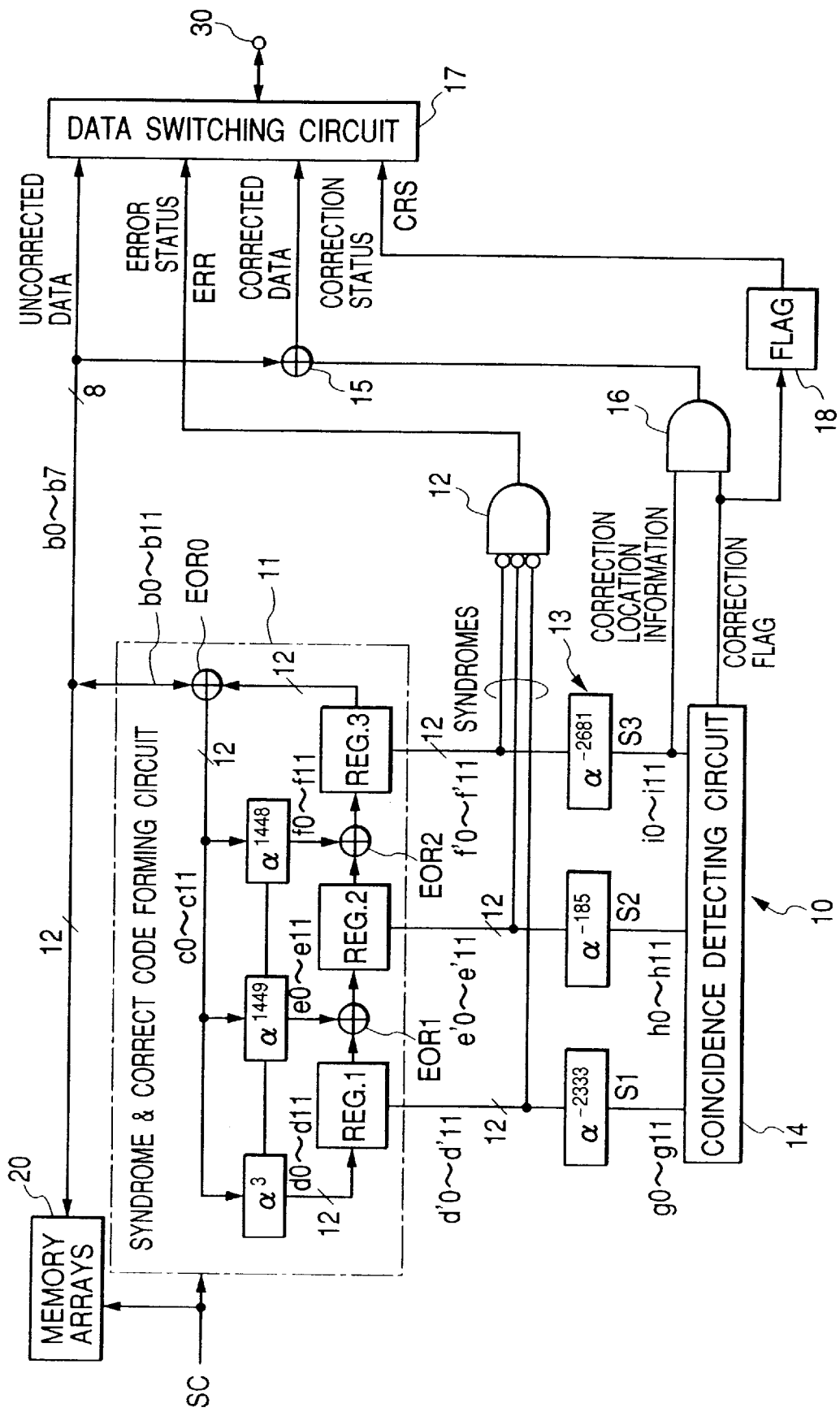
FIG. 1 is a block diagram of a flash memory embodying the invention, the figure showing an error correcting code generating and error correcting circuit included in the flash memory.

FIG. 1 is a block diagram of a flash memory embodying the invention, the figure showing a typical error correcting code generating and error correcting circuit 10 (called the ECC circuit hereunder) included in the flash memory.

The ECC circuit 10 comprises: a syndrome and correct code forming circuit 11 which successively receives one sector (e.g., 2,106 bytes) of data from a memory array and forms syndromes accordingly; an error judging circuit 12 for judging whether any error is included in the read-out data by checking to see if all formed syndromes are zeros; a correction location information generating circuit 13 for generating location information about faulty bits based on the formed syndromes; a coincidence detecting circuit 14 for checking to see which byte contains an error through comparison of three bytes (1 byte equals 12 bits) of data coming from the correction location information generating circuit 13; an error correcting circuit 15 for correcting any read error based on the generated correction located information; and a gate 16 for enabling and disabling the output of the correction location information generating circuit 13 to the error correcting circuit 15 in accordance with a detection signal from the coincidence detecting circuit 14.

The coincidence detecting circuit 14 recognizes a byte error when all three bytes of data from the correction location information generating circuit 13 coincide with one another. Of the bits making up each byte from the circuit 13, the bit set to "1" indicates the location of the erroneous bit. The error correcting circuit 15 for correcting read-out data based on the correction location information may be constituted illustratively by an EXCLUSIVE OR gate circuit.

In this flash memory embodying the invention, the data read uncorrected from the memory array are output to external terminals 30 via a data switching circuit 17. An error information signal ERR indicating the result of the check by the error judging circuit 12 is also sent to another external terminal 30 through the data switching circuit 17. The data corrected as per the correction location information and a correction status signal CRS indicating whether correction has been done are also output to another external terminal 30 through the switching circuit 17. The data switching circuit 17 may be included alternatively in an input/output circuit 26 (see FIG. 2), to be described later.

The correction status signal CRS indicating whether correction has been done is sent from a flag 18, set by a detection signal from the coincidence detecting circuit 14, to the external terminal 30 via the switching circuit 17. The correction status signal CRS may be a two-bit signal constituted by a bit designating the presence or absence of an error and by a bit indicating whether error correction has been achieved. Under a one-bit correction, two-bit detection scheme, if the two bits denote no error and no correction, that means there exists no error; if the two bits indicate the presence of a one-bit error and the execution of correction, that means there is a one-bit error that cannot be corrected; if the two bits show the presence of an error and the absence of correction, that means a two-bit error is detected (which cannot be corrected).

If a two-bit correction status signal CRS is output illustratively from eight external terminals 30, the flag 18 may be replaced by an eight-bit register. Two of the eight bits in the register may be used to constitute a flag representing the correction status signal CRST the remaining six bits are set to zeros which may be output through the external terminals 30. Alternatively, the correction status signal CRS and the error information signal ERR may be output through a terminal other than the external terminals for data input and output.

In this embodiment, the syndrome and correct code forming circuit 11 is based on the Reed-Solomon code. As such, the syndrome and correct code forming circuit 11 comprises: an $\alpha 3$ circuit; a 12-bit register Reg1 which holds the result of the computation by the $\alpha 3$ circuit; an $\alpha 1449$ circuit; a logic circuit EOR1 which computes the EXCLUSIVE OR of the result of the computation by the $\alpha 1449$ circuit with the data held in the register Reg1; a register Reg2 which holds the result of the logical operation by the logic circuit EOR1; an $\alpha 1448$ circuit; a logic circuit EOR2 which computes the EXCLUSIVE OR of the result of the computation by the $\alpha 1448$ circuit with the data held in the register Reg2; a register Reg3 which holds the result of the logical operation by the logic -circuit EOR2; and a logic circuit EOR0 which computes the EXCLUSIVE OR of input data with the data held in the register Reg3.

The $\alpha 3$ circuit obtains outputs d0 through d11 by logically operating on inputs c0 through c11, the logical operations being represented by equations shown below (Eqs. 1). The $\alpha 1449$ circuit acquires outputs e0. through e11 by logically operating on the inputs c0 through c11, the logical operations being represented by equations shown below (Eqs. 2). The $\alpha 1448$ circuit gains outputs f0 through f11 by logically operating on the inputs c0 through c11, the logical operations being represented by equations shown below (Eqs. 3). In the equations indicated, encircled plus signs denote an EXCLUSIVE OR operation each. The equations are as follows;

(Eqs. 1)

$d0 = c9$ $d1 = c9 \oplus c10$ $d2 = c10 \oplus c11$ $d3 = c0 \oplus c9$ $d4 = c1 \oplus c9$ $d5 = c2 \oplus c10$ $d6 = c3 \oplus c9 \oplus c11$ $d7 = c4 \oplus c10$ $d8 = c5 \oplus c11$ $d9 = c6$ $d10 = c7$ $d11 = c8$ (Eqs. 2)

$e0 = c9 \oplus c10 \oplus c11$ $e1 = c0 \oplus c9$ $e2 = c0 \oplus c1 \oplus c10$ $e3 = c0 \oplus c1 \oplus c2 \oplus c11$ $e4 = c1 \oplus 2 \oplus c3 \oplus c9 \oplus c10 \oplus c11$ $e5 = c2 \oplus c3 \oplus c4 \oplus c10 \oplus c11$ $e6 = c3 \oplus c4 \oplus c5 \oplus c9 \oplus c10$ $e7 = c4 \oplus c5 \oplus c6 \oplus c10 \oplus c11$ $e8 = c5 \oplus c6 \oplus c7 \oplus c11$ $e9 = c6 \oplus c7 \oplus c8$ $e10 = c7 \oplus c8 \oplus c9$ $e11 = c8 \oplus c9 \oplus c10$ (Eqs. 3)

$f0 = c0 \oplus c10 \oplus c11$ $f1 = c0 \oplus c1 \oplus c10$ $f2 = c0 \oplus c1 \oplus c2 \oplus c11$ $f3 = c1 \oplus c2 \oplus c3$ $f4 = c2 \oplus c3 \oplus c4 \oplus c10 \oplus c11$ $f5 = c3 \oplus c4 \oplus c5 \oplus c11$ $f6 = c4 \oplus c5 \oplus c6 \oplus c10 \oplus c11$ $f7 = c5 \oplus c6 \oplus c7 \oplus c11$ $f8 = c6 \oplus c7 \oplus c8$ $f9 = c7 \oplus c8 \oplus c9$ $f10 = c8 \oplus c9 \oplus c10$ $f11 = c9 \oplus c10 \oplus c11$ The error judging circuit 12 is composed of an AND gate circuit whose output is set to a logical "1" when its input signals are all set to a logical "0."

The correction location information generating circuit 13 is made Up of an $\alpha$-2333 circuit, an $\alpha$-185 circuit, and an $\alpha 2681$ circuit. The $\alpha$-2333 circuit acquires outputs g0 through g11 by performing EXCLUSIVE OR operations on input data d'0 through d'11 held in the register Reg1, the operations being represented by equations shown below (Eqs. 4). The $\alpha$-185 circuit obtains outputs h0 through h11 by performing EXCLUSIVE OR operations on input data e'0 through e'11, the operations being represented by equations shown below (Eqs. 5). The $\alpha$-2681 circuit gains outputs i0 through i11 by performing EXCLUSIVE OR operations on input data f'0 through f'11, the operations being represented by equations shown below (Eqs. 6).

(Eqs. 4)

$g0 = d'0 \oplus d'3 \oplus d'5 \oplus d'7 \oplus d'8 \oplus d'9 \oplus d'10 \oplus d'11$ $g1 = d'0 \oplus d'1 \oplus d'3 \oplus d'4 \oplus d'5 \oplus d'6 \oplus d'7$ $g2 = d'0 \oplus d'1 \oplus d'2 \oplus d'4 \oplus d'5 \oplus d'6 \oplus d'7 \oplus d'8$ $g3 = d'1 \oplus d'2 \oplus d'3 \oplus d'5 \oplus d'6 \oplus d'7 \oplus d'8 \oplus d'9$ $g4 = d'0 \oplus d'2 \oplus d'4 \oplus d'5 \oplus d'6 \oplus d'11$ $g5 = d'0 \oplus d'1 \oplus d'3 \oplus d'5 \oplus d'6 \oplus d'7$ $g6 = d'1 \oplus d'2 \oplus d'3 \oplus d'4 \oplus d'5 \oplus d'6 \oplus d'9 \oplus d'10 \oplus d'11$ $g7 = d'0 \oplus d'2 \oplus d'3 \oplus d'4 \oplus d'5 \oplus d'6 \oplus d'7 \oplus d'10 \oplus d'11$ $g8 = d'1 \oplus d'3 \oplus d'4 \oplus d'5 \oplus d'6 \oplus d'7 \oplus d'8d'11$ $g9 = d'0 \oplus d'2 \oplus d'4 \oplus d'5 \oplus d'6 \oplus d'7 \oplus d'8d'9$ $g10 = d'1 \oplus d'3 \oplus d'5 \oplus d'6 \oplus d'7 \oplus d'8 \oplus d'9 \oplus d'10$ $g11 = d'2 \oplus d'4 \oplus d'6 \oplus d'7 \oplus d'8 \oplus d'9 \oplus d'10 \oplus d'11$ (Eqs. 5)

$h0 = e'1 \oplus e'6 \oplus e'9 \oplus e'10 \oplus e'11$ $h1 = e'0 \oplus e'1 \oplus e'2 \oplus e'6 \oplus e'7 \oplus e'9 \oplus$ $h2 = e'0 \oplus e'1 \oplus e'2 \oplus e'3 \oplus e'7 \oplus e'8 \oplus e'10$ $h3 = e'1 \oplus e'2 \oplus e'3 \oplus e'4 \oplus e'8 \oplus e'9 \oplus e'11$ $h4 = e'1 \oplus e'2 \oplus e'3 \oplus e'4 \oplus e'5 \oplus e'6 \oplus e'11$ $h5 = e'0 \oplus e'2 \oplus e'8 \oplus e'4 \oplus e'5 \oplus e'6 \oplus e'7$ $h6 = e'0 \oplus e'3 \oplus e'4 \oplus e'5 \oplus e'7 \oplus e'8 \oplus e'9 \oplus e'10 \oplus e'11$ $h7 = e'1 \oplus e'4 \oplus e'5 \oplus e'6 \oplus e'8 \oplus e'9 \oplus e'10 \oplus e'11$ $h8 = e'2 \oplus e'5 \oplus e'6"e'7 \oplus e'9 \oplus e'10 \oplus e'11$ $h9 = e'3 \oplus e'6 \oplus e'7 \oplus e'8 \oplus e'10 \oplus e'11$ $h10 = e'4 \oplus e'7 \oplus e'8 \oplus e'9 \oplus e'11$ $h11 = e'0 \oplus e'5 \oplus e'8 \oplus e'9 \oplus e'10$ (Eqs. 6)

$i0 = f3 \oplus f4 \oplus f5 \oplus f9$ $i1 = f3 \oplus f6 \oplus f9 \oplus f10$ $i2 = f0 \oplus f4 \oplus f7 \oplus f10 \oplus f11$ $i3 \pm f1 \oplus f5 \oplus f8 \oplus 11$ $i4 = f2 \oplus f3 \oplus f4 \oplus f5 \oplus f6$ $i5 = f3 \oplus f4 \oplus f5 \oplus f6 \oplus f7$ $i6 = f3 \oplus f6 \oplus f7 \oplus f8 \oplus f9$ $i7 = f0 \oplus f4 \oplus f7 \oplus f8f9 \oplus f10$ $i8 = f0 \oplus f1 \oplus f5 \oplus f8 \oplus f9 \oplus f10 \oplus f11$ $i9 = f0 \oplus f1 \oplus f2 \oplus f6 \oplus f9 \oplus f10 \oplus f11$ $i10 = f1 \oplus f2 \oplus f3 \oplus f7 \oplus f10 \oplus f11$ $i11 = f2 \oplus f3 \oplus f4 \oplus f8 \oplus f11$ For a data write operation, the syndrome and correct code forming circuit 11 functions as an ECC code generating circuit. Externally supplied data are input unmodified to the memory array (data latch) while being input simultaneously to the syndrome and correct code forming circuit 11. A shift register inside the syndrome and correct code forming circuit 11 acts in synchronism with an external data input-clock SC. After all data (e.g., data composed of 2,106 bits) have been input, the data held in the registers Reg1 through Reg3 make up three bytes of data (1 byte=12 bites) with ECC-use redundant codes. The three bytes are sent to the memory array (data latch) so as to be attached to the end of the previously sent data, the data being stored altogether in one sector of the memory.

How the ECC circuit of the above embodiment works in a data read operation is describe below with reference to the timing chart of FIG. 6.

Figure 6:
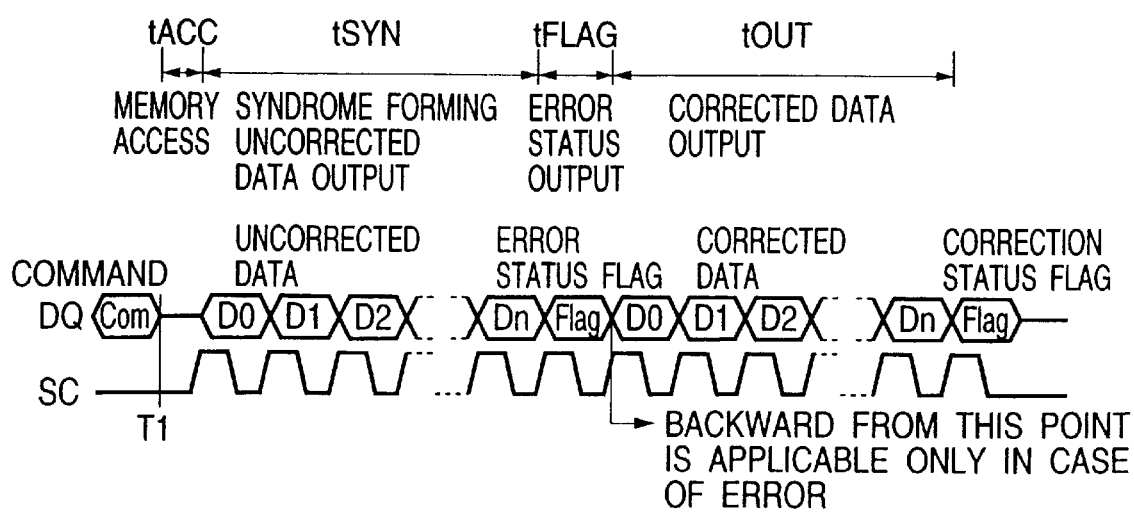
FIG. 6 is a timing chart depicting typical operation timings of an error correcting circuit in the flash memory according to the invention.
Figure 7:
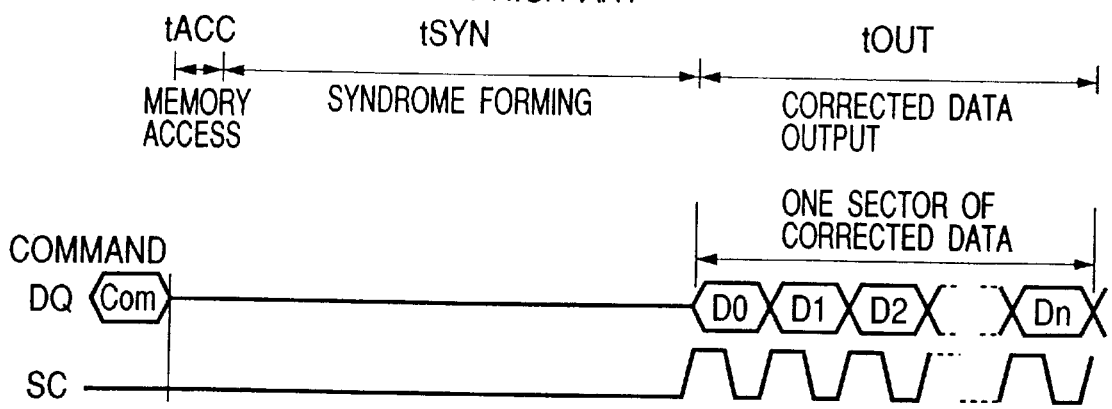
FIG. 7 is a timing chart showing typical operation timings of an error correcting circuit in a flash memory incorporating a conventional ECC circuit.
Figure 8A:
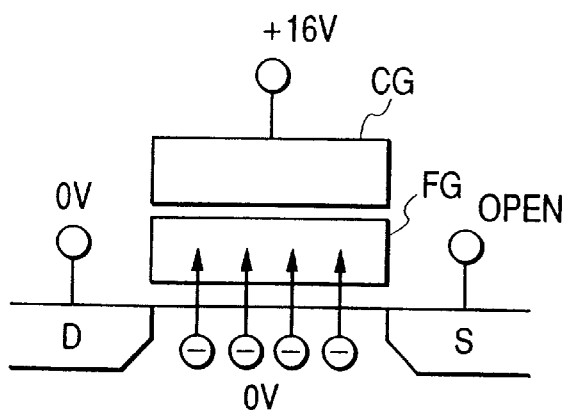
FIGS. 8A and 8B are explanatory views indicating bias voltages applied to a memory cell subject to a data write and a data erase operation in a flash memory.
Figure 8B:
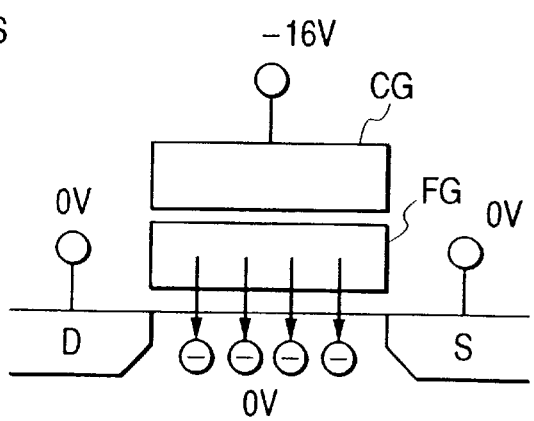

In response to a data read request entered illustratively in the form of a command code from an external microprocessor or the like to the flash memory, a control circuit in the memory starts a memory cell selection operation based on an address signal input together with the command code, i.e., starts selecting a word line corresponding to the input address (timing T1 in FIG. 6).

Figure 4:
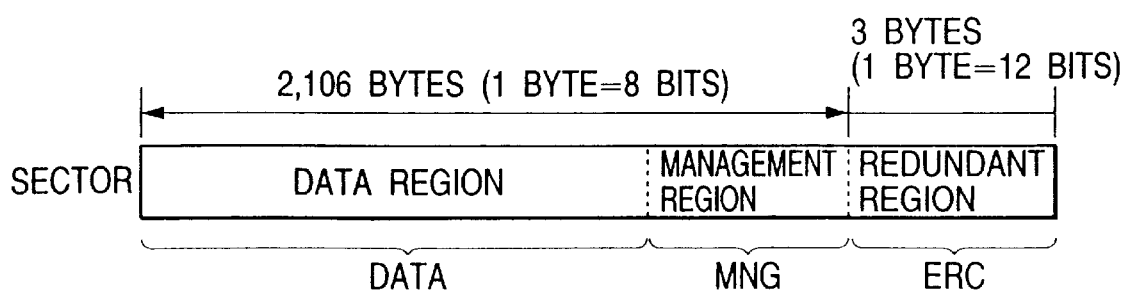
FIG. 4 is an explanatory view of a sector in the inventive flash memory.

The data read from the selected memory cells of, say, one sector are sent through bit lines in the memory array to a sense latch circuit for amplification. The amplified data are latched by data registers or the like. As shown in FIG. 4, each sector is constituted illustratively by a data region DATA that contains a data body, by a management region MNG that contains management information such as a sector number and an update count, and by an ECC redundant region ERC that contains a redundant code for coded data for error correction. The data retrieved from the data region, management region and redundant region, in that order, of the sector are all sent to the ECC circuit 10. In this embodiment, the data in the data region DATA and management region MNG make up a code unit amounting to 2,106 bytes (1 byte=8 bits); the redundant code is three bytes long (1 byte=12 bits).

More specifically, the read-out data (1 byte=8 bits) latched by data registers 22a and 22b are supplemented with four dummy bits (e.g., 0000) per byte to constitute a 12-bit data structure for successive transfer to the ECC circuit 10. In this embodiment, the switching circuit 17 provides switching control such that the eight-bit data deprived of their dummy bits are sent out of the chip through the external terminal 30.

Given the transferred data, the ECC circuit 10 causes the syndrome and correct code forming circuit 11 to form syndromes. The formed syndromes are fed to the error judging circuit 12 which checks to see if the syndromes are all zeros. The result of the check is represented by an error information signal ERR. The signal ERR is forwarded to the external terminal 30 via the switching circuit 17 that effects switching the moment the transfer of the read-out data ends. The error information signal ERR denotes the absence of any error when set to a logical "1" and stands for the presence of an error when set to a logical "0."

By monitoring the signal ERR, an entity outside the chip is able to know whether any error bits are contained in the most recently output data from the external terminal. If no error is judged to exist, then the read-out data already acquired through the external terminal 30 are regarded as effective data so that the next process may be started. That is, the time required from the input of a read command to the acquisition of all read-out data is defined as "tACC+tSYN." This is approximately half the time required of the conventional scheme.

If the error information signal reveals the presence of error bits in the read-out data, then the read data request is continued or a new read data request is issued with regard to the flash memory. In response, the flash memory serially transfers one-sector-long data read from the memory array and latched by the data registers, to the ECC circuit 10 one byte at a time. The ECC circuit 10 generates correction location information and supplies it through the gate 16 to the error correcting circuit 15. At this point, the switching circuit 17 effects switching such that not any data from the memory array (i.e., from the data registers) but the corrected data sent from the error correcting circuit 15 are output to the external terminal 30.

In this manner, the data corrected by the ECC circuit are output to the external terminal 30. When the corrected data have all been output, the switching circuit 17 effects switching to output through the external terminal 30 a correction status signal CRS representing the content of a register 18 holding information indicating the execution of error correction. That is, in case of an error, the time required from the input of a read command to the acquisition of all read-out data is defined as "tACC+tSYN+tOUT." The processing in this case requires approximately the same time period as that under the conventional scheme.

Preparing a suitable command code is one way to issue a new data read request or to continue the current read request with regard to the flash memory in case of an error indicated by the signal ERR. However, because the flash memory of this embodiment is arranged to have the data registers and ECC circuit 10 operate in synchronism with an externally supplied serial clock SC during a data read operation, the serial clock SC need only be fed continuously from a microprocessor or the like to the flash memory in case of an error.

If no error is judged to exist on the basis of the signal ERR, supply of the serial clock SC to the flash memory need only be stopped. This causes the flash memory to stop retransmission of read-data and terminate the data read operation. When data are thus corrected only in case of an error getting detected in the read-out data, the time required for data reading is drastically reduced. Furthermore, since the inventive control scheme is simpler than the conventional scheme of reissuing the data request command, loads on the external device or on the controller in the flash memory are alleviated.

Figure 2:
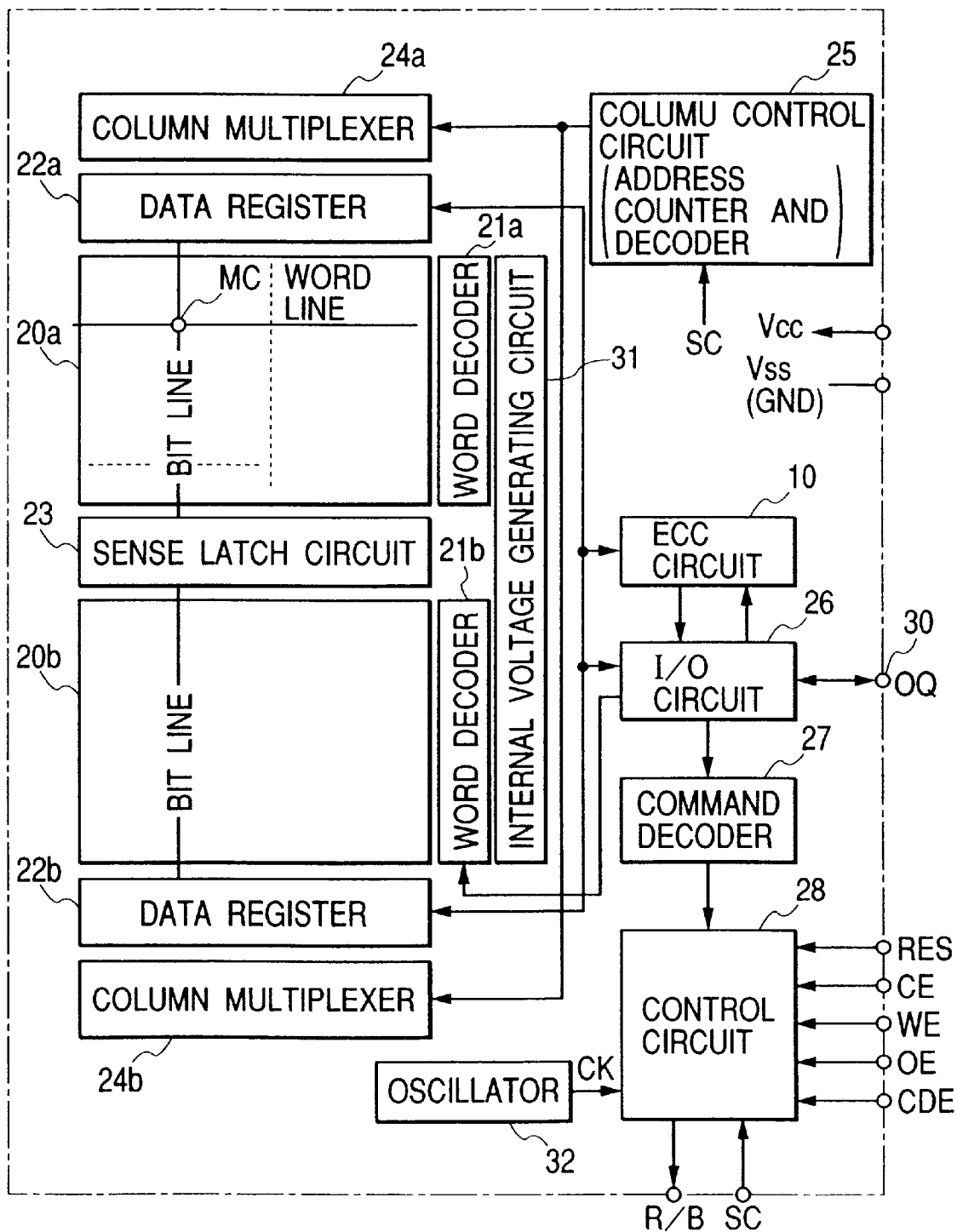
FIG. 2 is an overall block diagram of the flash memory embodying the invention.

FIG. 2 is a block diagram of the inventive flash memory with the ECC circuit of FIG. 1 mounted on a single semiconductor chip. In FIG. 2, memory arrays 20a and 20b are made of nonvolatile memory cells arranged in matrix fashion, each of the cells being constituted by an insulated gate field effect transistor with a floating gate. In the memory arrays, a plurality of word lines and a plurality of bit lines intersect to form a grid pattern. At each point of intersection between a word line and a bit line is amemorycell MC. The control gates of memory cells in a single row are connected to a word line. Alternatively, each word line itself may be arranged to form gate electrodes of memory cells. The drain of each memory cell is connected to the corresponding local bit line which in turn is rendered connectable to a main bit line through a selection MOSFET.

Word decoders 21a and 21b decode an externally input address signal to bring the corresponding word lines to the selected level in the memory arrays 20a and 20b. Data registers 22a and 22b are connected to the bit lines in the memory arrays 20a and 20b and hold read-out data or data to be written. A sense latch circuit 23 connected to the bit lines in the memory arrays 20 amplifies and retains read-out data. The data amplified by the sense latch circuit 23 can be transferred to the data registers 22a and 22b through the bit lines in the memory arrays 20a and 20b.

Column multiplexers 24a and 24b transmit read-out data from the data registers 22a and 22b to the ECC circuit 10 in a predetermined sequence. A column control circuit 25 comprises an address counter and a decoder. The address counter is updated by an externally supplied serial clock SC, and the decoder decodes the value on the address counter to create control signals for the column multiplexers 24a and 24b.

An input/output circuit 26 supplies the word decoders 21a and 21b with an externally input address signal, feeds the error correcting circuit 10 with externally entered data, and outputs corrected data from the error correcting circuit 10 to the external terminal 30. A command decoder 27 decodes a command code given by an external microprocessor or the like. A control circuit 28 successively generates control signals for circuits within the memory in order to execute processes specified by externally supplied commands. Effective commands for use by the flash memory of this embodiment include a read command, a write command and an erase command.

With this embodiment, externally issued command codes are input through the external terminals 30 which also handle addresses and write data; the input codes are then forwarded to the command decoder 27 via the input/output circuit 26. Because addresses, data and command codes are all input and output through the same external terminals, the number of terminals is far smaller than that in effect if such address, data or command codes were handled through different terminals.

Control signals entered externally into the control circuit 28 include a reset signal RES, a chip selection signal CE, a write control signal WE designating either a read or a write operation, an output control signal OE providing output timing, a serial clock SC, and a command enable signal CDE designating either a command or an address input. Control signals sent by the control circuit 28 to the outside include a ready/busy signal R/B indicating whether an external command input is acceptable.

In addition to the above circuits, the flash memory of this embodiment comprises an internal voltage generating circuit 31 and a clock generating circuit 32. Based on an external supply voltage Vcc of, say, 3.3V, the internal voltage generating circuit 31 generates voltages needed inside the chip such as a substrate potential, a write voltage, a read voltage and a verify voltage. The clock generating circuit 32 generates a clock (CK) required to control the internal operations. Where necessary, there may be added a defective address register that retains a location (address) of a defective bit, an address comparator that compares a Y address with a defective address, and a redundancy circuit that replaces a selected memory column with a spare memory portion at the time of an address match.

Illustratively, the flash memory of this embodiment includes the two memory arrays 20a and 20b corresponding to the data registers 22a and 22b. Each of the data registers 22a and 22b is arranged to amplify and hold data from memory cells of a single row sharing a word line in the applicable memory array. The read-out data held in the two data registers 22a and 22b are supplemented in increments of four bits with four dummy bits to constitute a 12-bit data structure or the like before the data are transferred to the ECC circuit 10 by the column multiplexers 24a and 24b.

In the embodiment of FIG. 1, the flash memory chip was shown incorporating an error correcting circuit. Alternatively, the error correcting circuit may be formed on a semiconductor chip separate from the flash memory.

The flash memory of the embodiment in FIG. 1 is a binary flash memory that stores one-bit data in each of its memory cells.

However, this is not limitative of the invention. The invention may also be applied to a multivalued flash memory wherein each memory cell, under suitable control regarding its threshold voltage, is arranged to store multiple-bit data. In the latter case, there need only be provided a binary/multiple value converting circuit interposingly between the data registers 22a and 22b on the one hand and the memory arrays 20a and 20b on the other hand, or between the data registers 22*a* and 22*b* on the one hand and the input/output circuit 26 on the other hand. The converting circuit is designed to convert externally input data into a data format suitable for write operations and to convert data retrieved from the memory arrays back to the original data format.

The converting circuit for conversion from binary to multiple values or vice versa need not be included in the flash memory. Alternatively, the functions of that converting circuit may be taken over by an external controller or the like.

Figure 5:
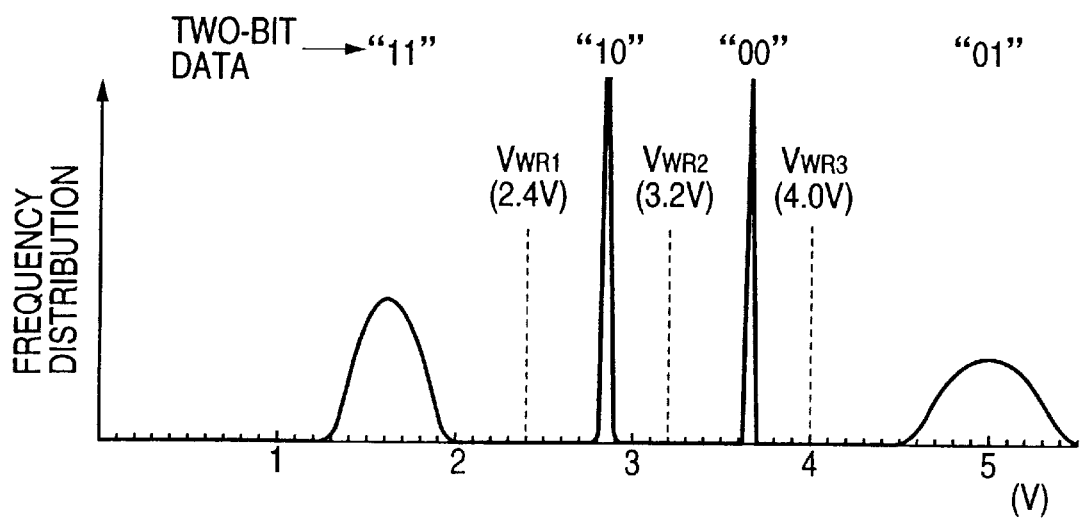
FIG. 5 is an explanatory view indicating relations of correspondence between stored data in memory cells and their threshold voltages in a multi valued flash memory, each of the cells storing two bits of data.

FIG. 5 is an explanatory view indicating relations of correspondence between stored data in each memory cell and its threshold voltage in a multivalued flash memory, each cell storing two-bit data. In FIG. 5, stored two-bit data "11" correspond to a threshold voltage ranging from 1.3V to 1.8V in distribution for the memory cell, data "10" to a threshold voltage from 2.8V to 2.9V, data "00" to a threshold voltage from 3.6V to 3.7V, and data "01" to a threshold voltage from 4.6V to 5.9V. Reference characters VWRl, VWR2 and VWR3 represent word line levels at which to read data; the levels are illustratively selected to be 2.4V, 3.2V and 4.0V respectively. These voltages are each chosen to be an intermediate potential between the peaks of each of the threshold voltages distributed as indicated above. However, the relations between data and the threshold voltages in FIG. 5 are not limitative of the invention. Many other alternative relations may be adopted depending on the data write scheme in use. For example, data "00" may be arranged to correspond to the lowest threshold voltage and data "11" to the highest threshold voltage.

Figure 3:
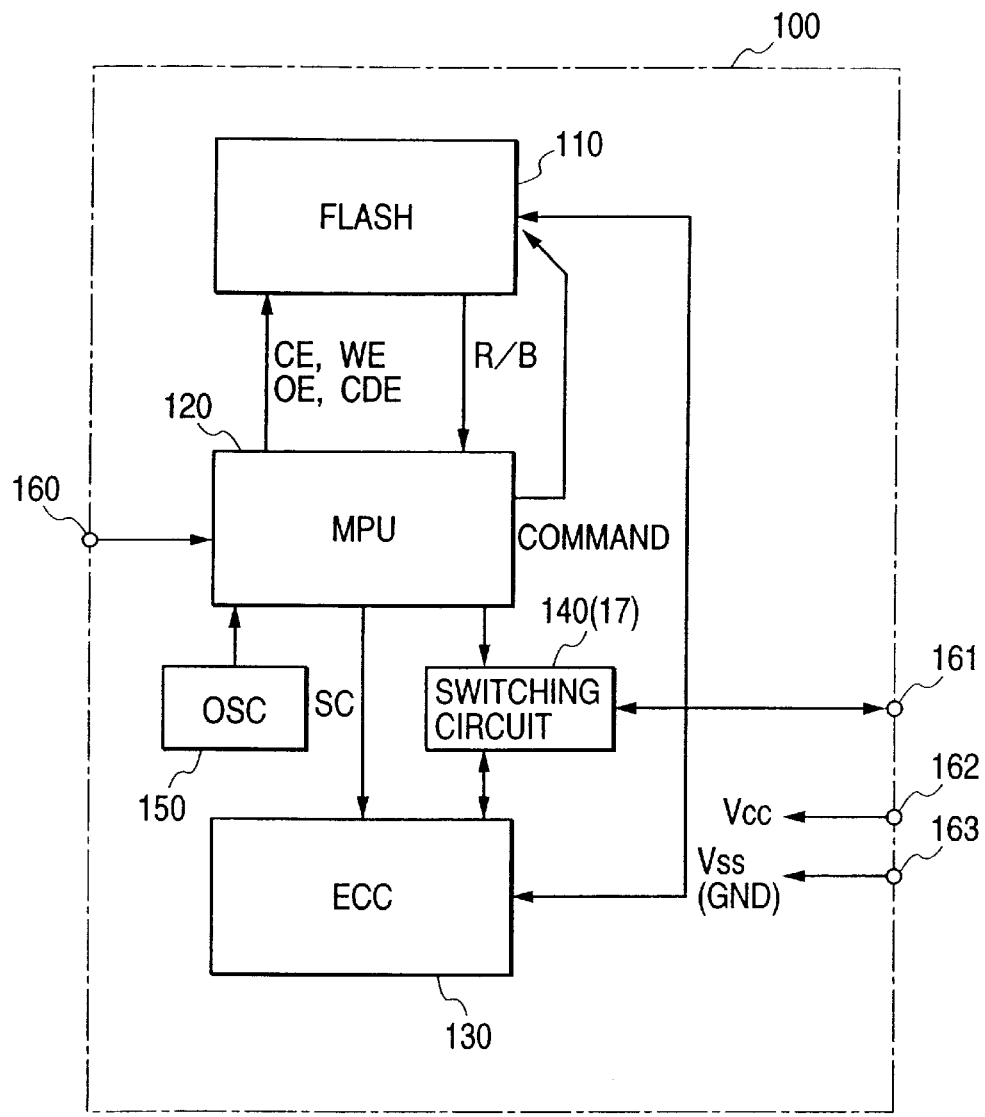
FIG. 3 is a block diagram of a memory card as a typical system utilizing the flash memory according to the invention.

FIG. 3 is a block diagram of a memory card utilizing the flash memory according to the invention. The memory card of this embodiment illustrative comprises: a flash memory chip (FLASH) 110; a microprocessor (MPU) 120 which controls write and read operations to and from the flash memory chip 110 in accordance with externally supplied commands; an error correcting code generating and error correcting circuit chip 130 capable of correcting data errors; a chip 140 embodying the data switching circuit 17 in the example of FIG. 1; and a clock generating circuit 150 having an oscillator for generating a clock CLK for the 14fi, microprocessor 120. All these components are mounted on a printed circuit board 100 and are molded in plastic resin or the like.

The memory card has an external terminal 160 which, inserted into a card slot of a body of an external personal computer or the like, permits input of control signals into the card. The flash memory chip 110 is accessed by the microprocessor 120 for data read and write operations, the microprocessor 120 accomplishing the operations by supplying the flash memory chip 110 with command codes as well as a serial clock SC and control signals CE, WE, CDE and OE.

Data are written to or read from the card by means of the error correcting code generating and error correcting circuit chip 130 and an external terminal 161. The microprocessor 120 issues the serial clock SC to the error correcting code generating and error correcting circuit chip 130, and feeds a data switching control signal 161 to the data switching circuit chip 140.

In FIG. 3, reference numeral 162 denotes an external power terminal that receives a supply voltage Vcc to be fed to the microprocessor 120 and flash memory chip 110, and 163 represents an external ground terminal connected to ground potential. The constitution of the memory card incorporating the flash memory in FIG. 3 is not limitative of this invention. Alternatively, a memory card may comprise a flash memory incorporating the ECC circuit included in the example of FIG. 1. As another alternative, a memory card may be constituted by a controller and a flash memory, the controller incorporating functions of an ECC circuit and a microprocessor in a single semiconductor chip, the flash memory being free of an ECC circuit.

It is also possible to assemble not one but a plurality of flash memory chips into one setup. In this case, each chip should preferably be equipped with its own ECC circuit to attain higher speeds of read and write operations; alternatively, one ECC circuit may be shared by the multiple flash memory chips configured.

Although the description above contains many specificities, these should not be construed as limiting the scope of the invention but as merely providing illustrations of some of the presently preferred embodiments of this invention. It is to be understood that changes and variations may be made without departing from the spirit or scope of the claims that follow. For example, although the embodiments above were shown using the ECC circuit based on the Reed-Solomon code as its error correcting code, the invention may also be applied to a flash memory employing an ECC circuit based on the Hamming code or BCH code. As another alternative, there may be provided a flash memory incorporating an ECC circuit which may be separated electrically from the other circuits by a bonding wire switchover or by use of a mode control signal, so that the flash memory deprived of the separated ECC circuit may be handled as a conventional flash memory. Such arrangements further enhance general versatility of the inventive flash memory.

Although the description above has dealt primarily with the field of flash memories and memory cards incorporating such flash memories constituting the technical background of this invention, that field is not limitative of this invention.

Alternatively, the invention may be applied as well to EEPROM chips, RAM chips, a memory card incorporating such a chip, and a memory module with a plurality of memory chips mounted on a single board.

To sum up, the major benefits of the invention disclosed herein involve shortening the time required to read data from a nonvolatile memory device having an error correcting function, and allowing an external entity to verify the presence or absence of error in the data retrieved from the memory device as well as the status of error correction in connection with the read-out data.

What is claimed is:

1. A memory device comprising:
   a memory array including a plurality of nonvolatile memory cells arranged in a matrix fashion, each of said nonvolatile memory cells having a control gate and a floating gate and having a threshold voltage corresponding to data held therein; and
   an error correcting circuit which receives data read from a plurality of memory cells in said memory array and which generates syndromes to indicate whether the read-out data includes any error and to correct said any error included in the read-out data,
   wherein said read-out data are sent in a predetermined block from said memory array to said error correcting circuit while being externally output simultaneously,
   wherein said error correcting circuit externally outputs, either upon completion of the data output or immediately thereafter, an error status signal indicating whether any error is included in said read-out data, and
   wherein upon detection of any error in said read-out data of said predetermined block from said memory array, said error correcting circuit corrects said error.

2. A memory device according to claim 1, further comprising data holding means for holding data read in a predetermined block from a plurality of memory cells in said memory array, wherein, if any error is found included in the readout data, said data holding means causes said read-out data held therein to be corrected by said error correcting circuit before having the corrected data output externally.

3. A memory device according to claim 2, further comprising means for outputting correction status information if any error in said read-out data has been corrected by said error correcting circuit.

4. A memory device according to claim 3, wherein said correction status information includes information indicating whether the error in said read-out data has been corrected properly.

5. A memory device according to claim 2, 3 or 4, wherein the data read uncorrected from said memory array and the corrected data furnished by said error correcting circuit are output in synchronism with an externally supplied clock signal.

6. A memory device according to any one of claims 1 through 5 wherein said memory array and said error correcting circuit are formed on a single semiconductor chip, and wherein the uncorrected and the corrected read-out data are output from a terminal also acting as a terminal through which to input a signal denoting a data read request from the outside.

7. A memory card incorporating a memory device according to any one of claims 1 through 6, and a control unit for issuing read requests to said memory device.

8. A nonvolatile semiconductor memory device comprising:
- a plurality of memory cells for accommodating data, each of said memory cells having a threshold voltage corresponding to data held therein;
- an error correcting circuit; and
- an output circuit;
- wherein data read from memory cells selected from among said plurality of memory cells are supplied to said error correcting circuit and said output circuit,
- wherein said error correcting circuit generates syndromes to indicate whether the data includes any error and supplies said output circuit with an error status flag to indicate whether said any error is included in the data from the selected memory cells,
- wherein said output circuit outputs said data from said selected memory cells as well as said error status flag, and
- wherein said error correcting circuit detects a location of the error in said data read by said output circuit from said selected memory cells, and corrects said error.

9. A nonvolatile semiconductor memory device according to claim 8, further comprising a latching circuit for accommodating said data from said selected memory cells, wherein, upon detection of any error in said data from said selected memory cells, the data held in said latching circuit are corrected before being output.

10. A nonvolatile semiconductor memory device according to claim 9, wherein said output circuit outputs the corrected data from said selected memory cells as well as a correction status flag.

11. A nonvolatile semiconductor memory device according to claim 10, wherein said correction status flag constitutes information indicating whether any error included in said data from said selected memory cells has been corrected.

12. A nonvolatile semiconductor memory device according to claim 11, wherein said data from said selected memory cells, said error status flag, said corrected data, and said correction status flag are output in synchronism with a clock signal.

13. A nonvolatile semiconductor memory device according to claim 12, wherein a data read command entered through an input/output terminal causes said data from said selected memory cells, said error status flag, said corrected data, and said correction status flag to be output through said input/output terminal.

14. A nonvolatile semiconductor memory device according to claim 13, wherein the threshold voltage of each of said plurality of memory cells is any one of a first threshold voltage region considered to denote an erase state and of a plurality of threshold voltage regions which differ from said first threshold voltage region and which are regarded as representative of a write state.

* * * * *